June 26, 1973   F. S. ALCOTT   3,741,730
EXHAUST COMBUSTION SYSTEM
Filed Jan. 3, 1972
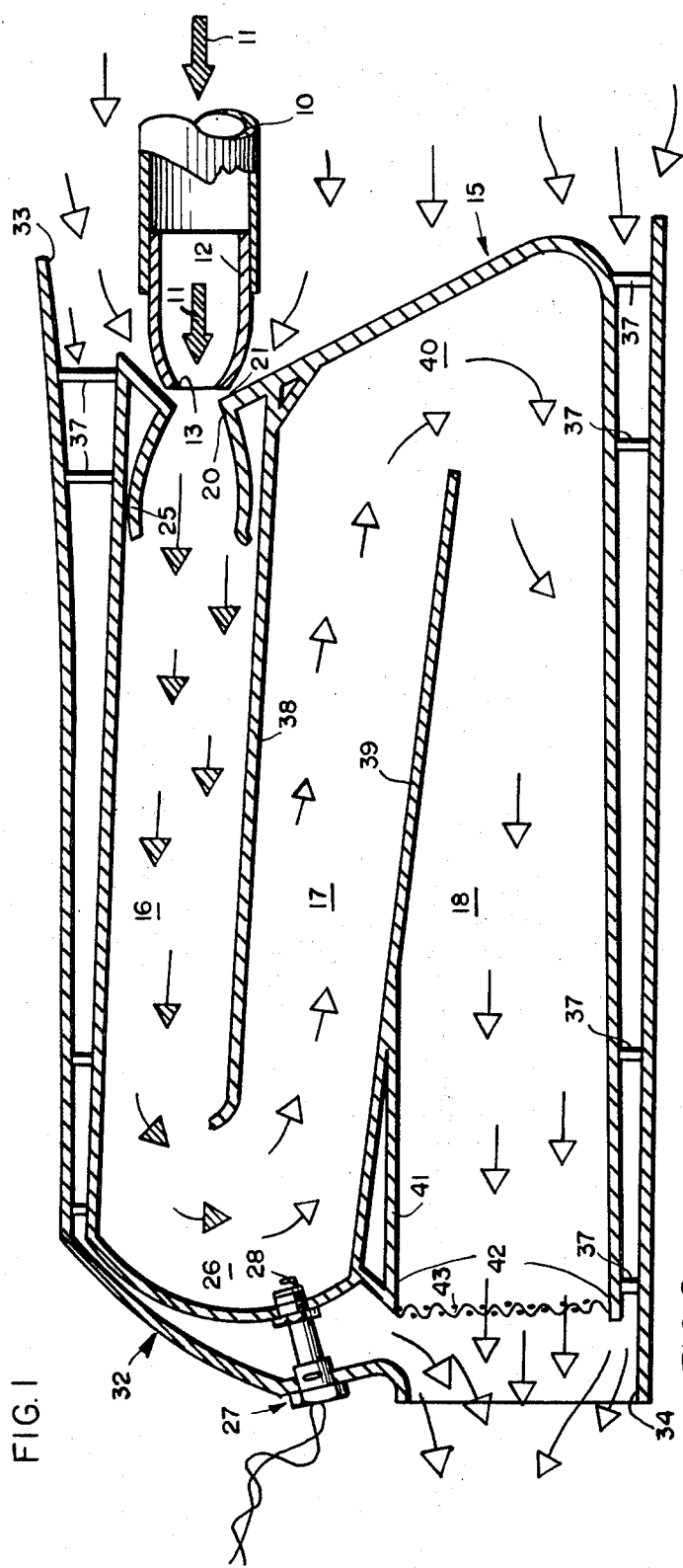
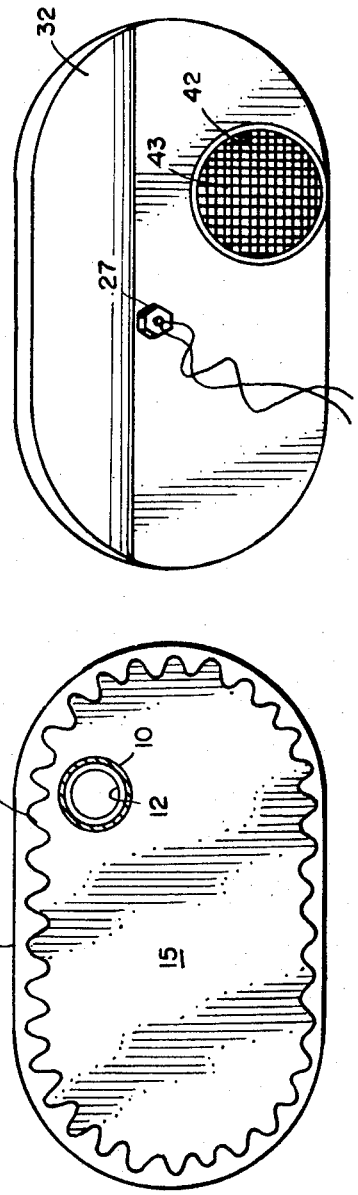

United States Patent Office 3,741,730
Patented June 26, 1973

3,741,730
EXHAUST COMBUSTION SYSTEM
Frederick S. Alcott, 8436 Kedvale Ave.,
Skokie, Ill. 60076
Filed Jan. 3, 1972, Ser. No. 214,686
Int. Cl. F01n 3/14
U.S. Cl. 23—277 C                                5 Claims

ABSTRACT OF THE DISCLOSURE

Devices disclosed for inclusion in the exhaust system of a vehicle to achieve a more complete combustion of the exhaust gases prior to admitting them to the atmosphere. The device includes an inlet venturi which receives the exhaust gases from a vehicle's engine and also draws in fresh air for mixing with the exhaust gases. The device includes an inner labyrinth-chamber defining member and an outer shell separated by a corrugated steel spacer. Atmospheric air is forced through the space between the outer shell and the labyrinth by the motion of the vehicle for cooling. The labyrinth defines a series of interconnected chambers of increasing cross sectional area, the first of which extends longitudinally of the device and passes the exhaust gases mixed with fresh air adjacent a spark plug which periodically ignites the passing mixture. A second chamber passes the ignited gases in counter current with respect to the first chamber and into a third expanding chamber in which the direction of flow is again reversed. The cooling air encompassing the labyrinth mixes with the final exhaust gas from the third expansion chamber which passes through a flame screen.

BACKGROUND OF THE INVENTION

Field of the invention

The present invention relates to a system for completing the combustion of gases in an internal combustion engine; more particularly, it relates to a system for igniting gases from an engine to eliminate carbon monoxide.

Known systems

The two principal methods for reducing carbon monoxide in the exhaust gases of an internal combustion engine include first, the use of a catalytic element adjacent the exhaust manifold for enhancing complete combustion of carbon monoxide as it exhausts. However, these type of devices have the inherent problem that with the high lead gasolines currently marketed for high combustion engines, the lead plates out on the catalytic element and reduces its effectiveness such that as time goes on, the device becomes less and less effective in eliminating carbon monoxide from the exhaust gas of the engine. The second type of system normally suggested by reducing carbon monoxide is to ignite the exhaust gases. This type of system, although a little more costly than the first system retains its effectiveness simply by replacing the spark plug normally used to cause ignition; but this type of system normally is not as effective in reducing the level of carbon monoxide in the exhaust gases, primarily because of incomplete combustion within the device itself. Further, because of the additional combustion within the device, systems of this type tend to operate at elevated temperatures, thereby substantially reducing the lifetime of the system and creating a hazard to persons working on the vehicle.

SUMMARY

The present invention provides a device for the secondary combustion of exhaust gases which includes an inner labyrinth-chamber defining member having three separate but interconnected chambers having an increasing cross sectional area in the direction of gas flow from the point of combustion in order to enhance a more complete combustion. At the input, there is provided a venturi orifice which receives the exhaust gases and which admits fresh air into the first chamber. There, the fresh air is mixed with the exhaust gases, and the mixture is then routed through the second chamber in a reverse direction. Prior to entering the second chamber the mixture is ignited, so a second chamber defines an increasing cross sectional area in the direction of flow, and it leads into the third chamber, reversing the direction of the flow of gases. The third chamber also has an increasing cross sectional area, and it leads to an exhaust port. An outer shell surrounds and is spaced from the labyrinth-chamber defining member for continually passing fresh air over that member as the vehicle moves to cool it.

The outer casing or shell may be formed by stamping two separate pieces of sheet metal, and the inner labyrinth-chamber member may be similarly manufactured. The material may preferably be stainless steel or ceramic coated sheet metal to resist corrosion and provide a long life. Assembly of the device of the instant system is greatly facilitated by the structure, thus providing a device which may very simply be installed on any existing exhaust system and one which requires a minimum of labor and parts for installation. Further, there is little or no alteration to the existing exhaust system, and there are no moving parts that are added. In addition to the economy of the system so as to make it readily available to all existing automobiles, for example, there are no fine adjustments to be made either in dimensions or element placement to achieve the desired result of reducing the combustible elements in the automobiles exhaust.

Other features and advantages of the instant invention will be apparent to a person skilled in the art from the following detailed description of a preferred embodiment accompanied by the attached drawing wherein identical reference numerals will refer to like parts in the various views.

The drawing:
FIG. 1 is a horizontal cross sectional view of a system incorporating the present invention;
FIG. 2 is a front elevational view of the device of FIG. 1; and
FIG. 3 is a rear end view of the system of FIG. 1.

DETAILED DESCRIPTION

Turning then to FIG. 1, reference numeral 10 represents the exhaust pipe leading from the internal combustion engine of a vehicle and through which the heated exhaust gases flow in the direction of the arrows 11. An inner sleeve 12 is press-fitted into the exhaust orifice of the pipe 10, and it is provided with a constricted outlet 13 through which the exhaust gases are forced.

The inner sleeve 12 is connected to a labyrinth-chamber defining member generally designated 15 of the apparatus of the present invention for eliminating combustible exhaust by-products. The labyrinth-exhaust by-products is formed in symmetrical side sections which may then be welded or riveted together by means of abutting flanges to simplify manufacture. The half sections may be stamped or otherwise formed from steet metal. The labyrinth-chamber member 15 defines three separate connecting chambers generally designated respectively 16, 17 and 18, alternate chambers having a reverse flow direction. The first chamber 16 has an inlet orifice 20 adjacent the constricted outlet opening 13 of the inner sleeve 12, and it is spaced therefrom to provide an annular opening 21 between the constricted opening 13 and the inlet aperture 20 of the labyrinth-chamber member 15. This provides a venturi for sucking in fresh air as well as receiving the heated exhaust gases. An outwardly-flaring baffle 25 is formed integrally with the labyrinth-chamber member 15 to cause the exhaust gases and fresh intake air to experience a reduced pressure and to cause vortexes to mix the two. Thus, the chamber 16 is a mixing chamber in which the exhaust gases from the vehicle mix with fresh intake air, and this chamber may thus have a uniform cross sectional area as illustrated. The length of the chamber 16 depends upon the volume of gases intended to be treated, but it should be long enough to permit good mixing of the fresh intake air with the exhaust gases. The outlet of the chamber 16 is connected to the inlet of the chamber 17 in a generally U-shaped area denoted by reference numeral 26. A conventional sparkplug 27 having a firing tip 28 is secured to the chamber member 15 as well as to an outer shell generally designated by reference numeral 32. The shell 32 surrounds the labyrinth-chamber member 15 and it is provided with an enlarged forward opening as at 33 for trapping a fairly large volume of fresh air as the vehicle moves and forcing it over the labyrinth-chamber member 15 for cooling the latter. The shell or casing 32 also is provided with a rear exhaust opening 34 through which both the cooling fresh air passes after passing over the chamber member 15 and the treated exhaust gases, as will be explained presently. The chamber member 15 is spaced from the outer shell 32 by means of a corrugated spacer 36 (see FIG. 2) to provide conduits elongated in the direction of travel of the device for passing cooling air and to afford a better heat exhange mechanism for the labyrinth-chamber member 15. In addition, if desired, the spacing between the shell 32 and the chamber member 15 may be afforded by means of pegs 37 extending between the two in the surrounding cool air flow region.

Turning back to the spark plug 27, then, the firing tip 28 is located downstream of the mixing chamber 16 and at the location where the direction of flow of the incoming air is reversed into the first expansion chamber 17. That is, the chamber 17 is provided with an increasing cross sectional area from beginning to end. The chamber 17 is partially defined by a first wall 38 separating it from the mixing chamber 16 and a second wall 39 separating it from the chamber 18. The spacing of the walls 38 and 39 increases in the direction of flow of the gases ignited by the spark plug 27. A second U-shaped area 40 couples the gases flowing through the first mixing chamber 17 into the second mixing chamber 18, where the direction of flow is again reversed.

A major portion of the chamber 18 also has an increasing cross sectional area leading up to a separating wall 41 which partially defines an exhaust aperture 42. The expansion chambers 17 and 18 are considered an important aspect of the present invention located as they are downstream in the direction of flow from the point of ignition because I have found that this provision advantageously insures a more complete combustion of the gas mixture.

Located across the exhaust aperture 42 of the chamber member 15 is a first screen 43 which insures that no flame will be emitted from the chamber 18 by abruptly reducing the temperature of the gases through conduction at that point.

Thus, the present invention provides for a multi-chamber labyrinth in which, in a first chamber, the heated exhaust gases are mixed with fresh air drawn into the first chamber by the venturi principle through a reduced or constricted orifice. That is, the constricted orifice 13 of the inner sleeve 12 causes an increased flow but reduced pressure which draws in fresh air whether or not the vehicle is in motion. After affording sufficient time for mixing of the fresh air with the heated exhaust gas, the flow is reversed and the mixture is ignited at the inlet of an expansion chamber—namely the chamber 17. At the outlet of the chamber 17 the flow is again reversed into a second expansion chamber 18 from which the spent gases are exhausted. An outer casing is provided spaced from the chamber for trapping atmospheric air and forcing it over the chamber member to cool it. It will be observed that the spacing between the two parts is enlarged at the forward end and decreases toward the exhaust end to insure the trapping of a greater amount of air and then provide a greater velocity of the trapped air at the rear portion of the apparatus.

The device is installed beneath the vehicle with brackets and flexible metal tubing to eliminate costly stock piles of specially bent pipes. The spark plug for ignition, 27 is conventional; and it is wired via a wye-connector to the distributor centerpost to energize the firing tip 28 according to the number of cylinders in the internal combustion engine of the vehicle.

Having thus described in detail a preferred embodiment of the present invention, persons skilled in the art will be able to modify certain of the structure illustrated and to substitute elements for those which have been disclosed; and it is intended that all such modifications and substitutions be covered as they are embraced within the spirit and scope of the appended claims.

I claim:

1. A device for reducing the combustible gases in an exhaust system for an internal combustion engine having an exhaust pipe comprising a device having an inlet conduit adapted to be connected to said exhaust pipe, a chamber defining member formed from sheet metal and defining a plurality of interconnected chambers including a first chamber having an inlet opening adjacent said conduit and a venturi adjacent said inlet opening for receiving fresh air as well as said exhaust gases and mixing the same in said first chamber, a second chamber receiving the gases mixed in said first chamber and defining an increasing cross sectional area in the direction of flow for expanding treated gases and a third chamber receiving the gases from said second chamber and forcing them in counter current to an exhaust opening; spark plug means secured to said chamber member adjacent the interconnection between said mixing chamber and said expansion chamber for intermittently igniting gases therein; an outer shell spaced from said chamber member and including an enlarged forward opening at least as large as the cross sectional area of said chamber member for trapping gases and forcing the same through the spacing between said casing and said chamber member to cool the latter, said gases being routed to an exhaust opening for mixing with the treated gases passing through said chamber member; and spacer means for maintaining the separation between said casing and said chamber member.

2. The system of claim 1 wherein said conduit comprises an adapter arranged to be press-fitted into said exhaust pipe and including a constricted outlet aperture adjacent said venturi for increasing the flow and reducing the pressure of said exhaust gases, said venturi comprising an annular opening adjacent said constricted opening of said conduit through which fresh air is passed into said mixing chamber, said mixing chamber also being provided with a constricted inlet opening and an increasing cross sectional area immediately downstream of said inlet opening.

3. The apparatus of claim 1 wherein said spacer means includes a corrugated sheet metal member inserted in said space between said outer casing and said chamber member and defining a plurality of conduits elongated in the direction of travel of said device for forcing air therealong and for providing an improved heat transfer mechanism to remove heat from said chamber member.

4. The system of claim 1 wherein said second and said third chambers are characterized and providing the uniformly increasing cross sectional area to insure more complete combustion of said mixed gases received from said first mixing chamber, the direction of flow reversing between adjacent chambers.

5. The apparatus of claim 4 further comprising a wire mesh covering the exhaust aperture at the downstream end of said third chamber for reducing the temperature of gases flowing therethrough and prevent the emission of flames therefrom.

References Cited
UNITED STATES PATENTS

| | | | |
|---|---|---|---|
| 1,848,990 | 3/1932 | Boyd | 60—303 |
| 2,203,554 | 6/1940 | Uhri | 60—303 |
| 3,197,956 | 8/1965 | Clarke | 23—277 C |

DOUGLAS HART, Primary Examiner

U.S. Cl. X.R.

60—298, 303, 308